United States Patent
Guan

(10) Patent No.: US 12,079,268 B2
(45) Date of Patent: Sep. 3, 2024

(54) OBJECT RECOMMENDATION

(71) Applicant: BEIJING BAIDU NETCOM SCIENCE TECHNOLOGY CO., LTD., Beijing (CN)

(72) Inventor: Lijuan Guan, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/003,116

(22) PCT Filed: Mar. 16, 2022

(86) PCT No.: PCT/CN2022/081122
§ 371 (c)(1),
(2) Date: Dec. 22, 2022

(87) PCT Pub. No.: WO2023/050732
PCT Pub. Date: Apr. 6, 2023

(65) Prior Publication Data
US 2023/0350940 A1    Nov. 2, 2023

(30) Foreign Application Priority Data
Sep. 28, 2021   (CN) .......................... 202111143903.1

(51) Int. Cl.
*G06F 16/583* (2019.01)
*G06F 16/55* (2019.01)
(Continued)

(52) U.S. Cl.
CPC ............ *G06F 16/583* (2019.01); *G06F 16/55* (2019.01); *G06V 10/44* (2022.01); *G06V 10/761* (2022.01)

(58) Field of Classification Search
None
See application file for complete search history.

(56) References Cited

U.S. PATENT DOCUMENTS

2019/0295151 A1*  9/2019  Ghadar ............... G06F 16/9038
2020/0372047 A1* 11/2020  Wu ....................... G06F 16/587
(Continued)

FOREIGN PATENT DOCUMENTS

CN      102667777 A       9/2012
CN      105117399 A      12/2015
(Continued)

OTHER PUBLICATIONS

McAuley et al., "Image-Based Recommendations on Styles and Substitutes", 2015, Aug. 9, SIGIR '15: Proceedings of the 38th International ACM SIGIR Conference on Research and Development in Information Retrieval, pp. 43-52 https://doi.org/10.1145/2766462.2767755 (Year: 2015).*
(Continued)

Primary Examiner — Hosain T Alam
Assistant Examiner — Robert F May
(74) Attorney, Agent, or Firm — FisherBroyles, LLP

(57) ABSTRACT

The present disclosure provides techniques for recommending objects. The techniques can include: recognizing a retrieval image including a retrieval object from a target user. A retrieval feature can be obtained from the retrieval object, and at least one retrieval feature image can be obtained from a first database based on the retrieval feature. The retrieval image can include a plurality of feature images, and a target object image set can be obtained from a second database based on the at least one retrieval feature image. The target image set includes a plurality of object images to be recommended to the target user.

11 Claims, 5 Drawing Sheets

(51) Int. Cl.
*G06V 10/44* (2022.01)
*G06V 10/74* (2022.01)

(56) References Cited

U.S. PATENT DOCUMENTS

| | | | | |
|---|---|---|---|---|
| 2020/0394751 | A1* | 12/2020 | Song | G06F 18/253 |
| 2020/0401616 | A1* | 12/2020 | Tsuji | G06F 16/538 |

FOREIGN PATENT DOCUMENTS

| | | | | |
|---|---|---|---|---|
| CN | 105320703 | A | * | 2/2016 |
| CN | 106202362 | A | * | 12/2016 |
| CN | 109992685 | A | | 7/2019 |
| CN | 110110110 | A | | 8/2019 |
| CN | 112507153 | A | | 3/2021 |
| CN | 113190701 | A | | 7/2021 |
| CN | 113868453 | A | | 12/2021 |
| JP | 2020013594 | A | * | 1/2020 |
| WO | 2019127832 | A1 | | 7/2019 |
| WO | 2019178676 | A1 | | 9/2019 |
| WO | 20190183173 | A1 | | 9/2019 |

OTHER PUBLICATIONS

Office Action issued in the counterpart Chinese patent application No. 2021111439031 with Official mailing date of Mar. 16, 2023, 7 pages.
Zhang Tao (South China Normal University, Guangzhou, China) and Zhang Xing-ming (School of Computer Science and Engineering, South China Univ. of Technology, Guangzhou, China), "Techniques of Content-based Image Retrieval," Oct. 2004, vol. 3, No. 5, 8 pages.
Zhen-yan, Ji, et al., "Personalized Image Retrieval and Recommendation," Journal of Beijing University of Posts and Telecommunications, vol. 40 No. 3, Jun. 2017, 12 pages.
Int'l Search Report and Written Opinion for counterpart application PCT/CN2022/081122, mailing date Jul. 5, 2022, 12 pages.
First Office Action of the counterpart JP application No. 2022-581447, Official mailing date: Nov. 24, 2023, 4 pages.
EESR of the counterpart EP application No. 22822250.1, Official mailing date: Nov. 14, 2023, 7 pages.
The Integration of Image Recognition for Fashion Item Search and Recommendation, 11 pages (English Abstract included).
Haruki Inoue and Takuma Nakamura, "The Integration of Image Recognition for Fashion Item Search and Recommendation," Japan Industrial Publishing Co., Ltd., published Feb. 10, 2020, 11 pages (English Abstract Previously provided).

* cited by examiner

OBJECT RECOMMENDATION

CROSS-REFERENCE TO RELATED APPLICATION

This application is a United States National Phase application of International Patent Application Number PCT/CN2022/081122, filed Mar. 16, 2022, entitled "METHOD AND APPARATUS FOR RECOMMENDING AN OBJECT", which application claims priority to Chinese Patent Application No. 202111143903.1 filed on Sep. 28, 2021, the contents of which are incorporated herein by reference in their entirety.

TECHNICAL FIELD

The present disclosure relates to the field of computer technologies, in particular to recommendation technologies based on artificial intelligence, and specifically to a method and an apparatus for recommending an object, an electronic device, a computer-readable storage medium, and a computer program product.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

Recommendation technologies based on artificial intelligence has penetrated into various fields, where object recommendation technologies based on artificial intelligence implement recommendations of objects to a user based on features of the objects in combination with preferences of the user for the objects.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a method and an apparatus for recommending an object, an electronic device, a computer-readable storage medium, and a computer program product.

According to an aspect of the present disclosure, there is provided a method for recommending object, including: recognizing a retrieval feature of a retrieval object from a retrieval image of a target user including the retrieval object; obtaining, based on the retrieval feature, at least one retrieval feature image from a first database including a plurality of feature images; and obtaining, based on the at least one retrieval feature image, a target object image set from a second database including a plurality of object images, to be recommended to the target user.

According to another aspect of the present disclosure, there is provided an electronic device, including: one or more processors; and a memory storing one or more programs configured to be executed by the one or more processors, the one or more programs including instructions for: recognizing a retrieval feature of a retrieval object from a retrieval image of a target user including the retrieval object; obtaining, based on the retrieval feature, at least one retrieval feature image from a first database including a plurality of feature images; and obtaining, based on the at least one retrieval feature image, a target object image set from a second database including a plurality of object images, to be recommended to the target user.

According to another aspect of the present disclosure, there is provided a non-transitory computer-readable storage medium storing one or more programs, the one or more programs comprising instructions, which when executed by one or more processors of an electronic device, cause the electronic device to perform: recognizing a retrieval feature of a retrieval object from a retrieval image of a target user including the retrieval object; obtaining, based on the retrieval feature, at least one retrieval feature image from a first database including a plurality of feature images; and obtaining, based on the at least one retrieval feature image, a target object image set from a second database including a plurality of object images, to be recommended to the target user.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings exemplarily show embodiments and form a part of the specification, and are used to explain exemplary implementations of the embodiments together with a written description of the specification. The embodiments shown are merely for illustrative purposes and do not limit the scope of the claims. Throughout the accompanying drawings, the same reference numerals denote similar but not necessarily same elements.

DETAILED DESCRIPTION OF EMBODIMENTS

Exemplary embodiments of the present disclosure are described below in conjunction with the accompanying drawings, where various details of the embodiments of the present disclosure are included to facilitate understanding, and should only be considered as exemplary. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

The embodiments of the present disclosure will be described below in detail with reference to the accompanying drawings.

Figure 1:
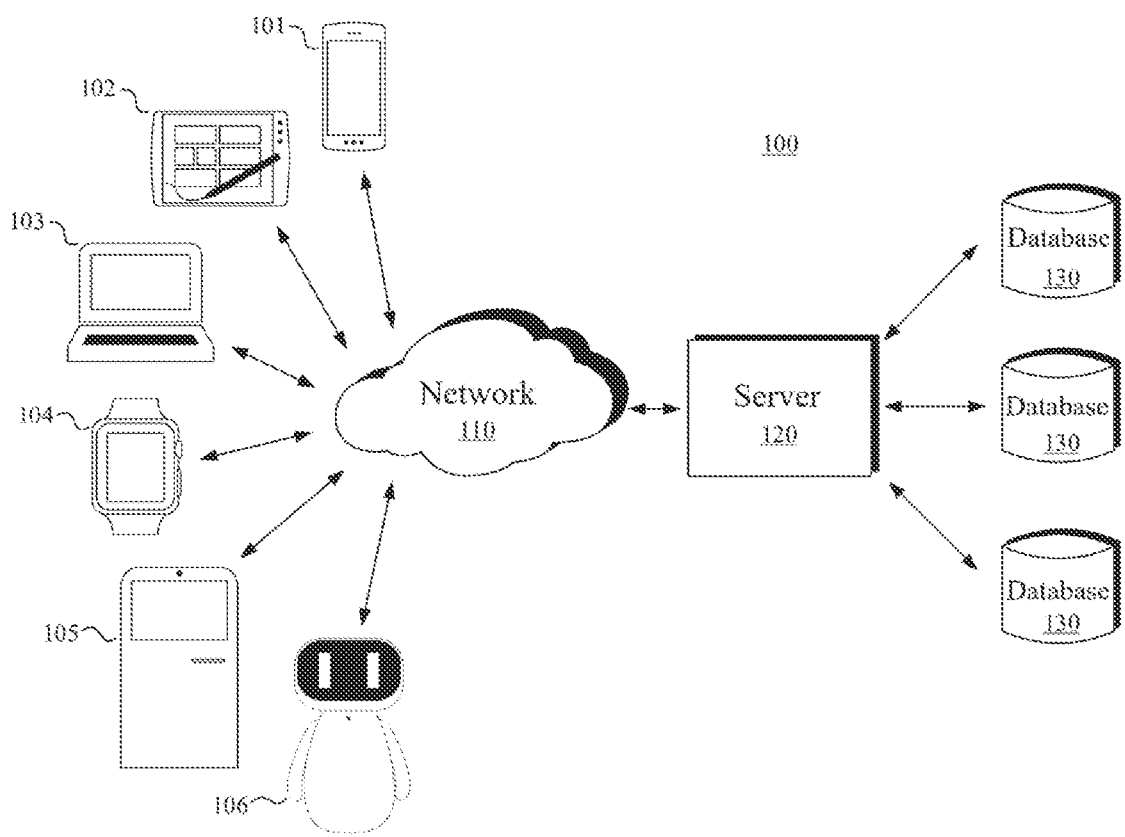
FIG. 1 is a schematic diagram of an exemplary system in which various methods described herein can be implemented according to an embodiment of the present disclosure.

FIG. 1 is a schematic diagram of an exemplary system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communications networks 110 that couple the one or more client devices to the server 120. The client devices 101, 102, 103, 104, 105, and 106 may be configured to execute one or more application programs.

In an embodiment of the present disclosure, the server 120 can run one or more services or software applications that enable a method for recommending an object to be performed.

In some embodiments, the server 120 may further provide other services or software applications that may include a non-virtual environment and a virtual environment. In some embodiments, these services may be provided as web-based services or cloud services, for example, provided to a user of the client device 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client device 101, 102, 103, 104, 105, and/or 106 may sequentially use one or more client application programs to interact with the server 120, thereby utilizing the services provided by these components. It should be understood that various system configurations are possible, which may be different from the system 100. Therefore, FIG. 1 is an example of the system for implementing various methods described herein, and is not intended to be limiting.

The user may use the client device 101, 102, 103, 104, 105, and/or 106 to watch a recommended object. The client device may provide an interface that enables the user of the client device to interact with the client device. The client device may also output information to the user via the interface. Although FIG. 1 depicts only six types of client devices, those skilled in the art will understand that any number of client devices are possible in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various messaging devices, and a sensor or other sensing devices. These computer devices can run various types and versions of software application programs and operating systems, such as MICROSOFT Windows, APPLE iOS, a UNIX-like operating system, and a Linux or Linux-like operating system (e.g., GOOGLE Chrome OS); or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display (such as smart glasses) and other devices. The gaming system may include various handheld gaming devices, Internet-enabled gaming devices, etc. The client device can execute various application programs, such as various Internet-related application programs, communication application programs (e.g., email application programs), and short message service (SMS) application programs, and can use various communication protocols.

The network 110 may be any type of network well known to those skilled in the art, and it may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and/or other networks.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above-mentioned operating systems and any commercially available server operating system. The server 120 can also run any one of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from users of the client devices 101, 102, 103, 104, 105, and 106. The server 120 may further include one or more application programs to display the data feeds and/or real-time events via one or more display devices of the client devices 101, 102, 103, 104, 105, and 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be used to store information such as an audio file and an object file. The data repository 130 may reside in various locations. For example, a data repository used by the server 120 may be locally in the server 120, or may be remote from the server 120 and may communicate with the server 120 via a network-based or dedicated connection. The data repository 130 may be of different types. In some embodiments, the data repository used by the server 120 may be a database, such as a relational database. One or more of these databases can store, update, and retrieve data from or to the database, in response to a command.

In some embodiments, one or more of the databases 130 may also be used by an application program to store application program data. The database used by the application program may be of different types, for example, may be a key-value repository, an object repository, or a regular repository backed by a file system.

The system 100 of FIG. 1 may be configured and operated in various manners, such that the various methods and apparatuses described according to the present disclosure can be applied.

Figure 2:
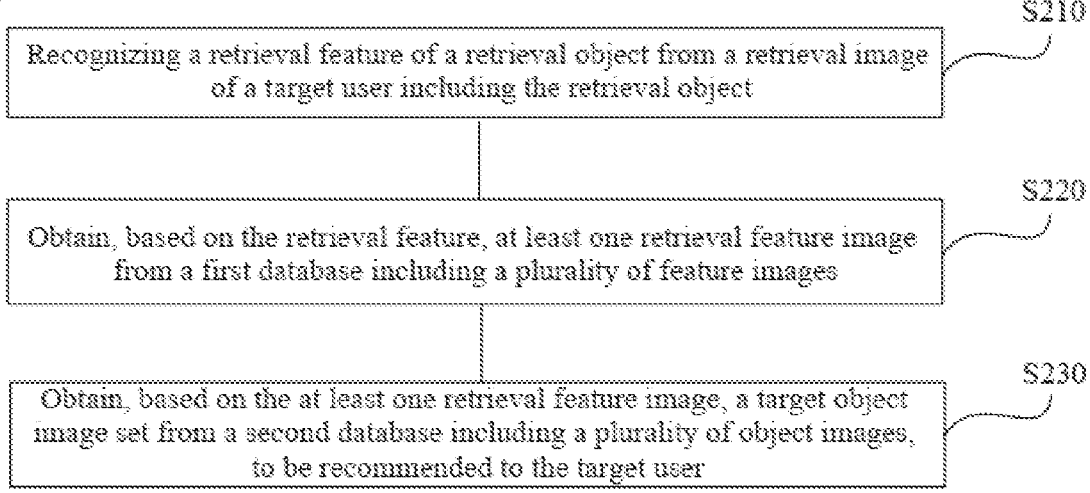
FIG. 2 is a flowchart of a method for recommending an object according to an embodiment of the present disclosure.

Referring to FIG. 2, a method for recommending an object 200 according to some embodiments of the present disclosure includes:

step S210: recognizing a retrieval image including a retrieval object from a target user, to obtain a retrieval feature of the retrieval object;

step S220: obtaining, based on the retrieval feature, at least one retrieval feature image from a first database including a plurality of feature images; and step S230: obtaining, based on the at least one retrieval feature image, a target object image set from a second database including a plurality of object images, to be recommended to the target user.

According to one or more embodiments of the present disclosure, the retrieval image including the retrieval object is recognized to obtain the retrieval feature (e.g., when the retrieval object is a mobile phone, the retrieval feature may be a mobile phone classification) of the retrieval object, and the feature image corresponding to the retrieval object is obtained from the first database including the plurality of feature images, and then the target object image set is obtained by matching the feature image with an object image database, to be recommended to the target user. Due to high definition and a good shooting angle of the feature images in the first database, a feature of the retrieval object is better reflected, such that the object image obtained based on the feature image is more accurate, that is, a target object image set recommended to the user is more accurate.

In the related art, during a process of recommending an object to a target user based on a retrieval image of the user, a target object image is obtained directly from an object image database based on the retrieval image of the target user, to be recommended to the target user, where the target object image recommended to the target user is one or more images that are similar to the retrieval image, and an object that matches the retrieval object can only be recommended when the image from the user is accurate. When the retrieval image from the user is not clear, a recommended object is often inaccurate, which cannot meet requirements of the user; and more abundant objects related to the retrieval object also cannot be recommended to the user based on the retrieval image.

For example, during item recommendation, if a current retrieval image from the target user is a photo of a mobile phone screen taken under a condition of insufficient light, a recommended object image may be mobile phones with various mobile phone screens. In an embodiment according to the present disclosure, a specific mobile phone brand of the retrieval object in the retrieval image may be recognized, such that a feature image corresponding to the mobile phone brand is obtained from the first database, where the feature image is an image that is clear and can reflect a real condition of the mobile phone brand, and the object image obtained from the second database based on the feature image is accurate, thereby enabling a mobile phone recommended to the user accurate.

According to an embodiment of the present disclosure, the first database, as an intermediate database for object recommendation and search, functions as a bridge, through which the retrieval object is linked to the object image database for the object recommendation, such that target object images in the target object image set that is recommended to the target user and obtained from the object image database are more abundant and accurate.

In some embodiments, the first database is a network image database for a web search, and the second database is the object image database for an object search, where the number of the plurality of object images is less than the number of the plurality of feature images.

The first database is set as the network image database, and the second database is set as the object image database, and because the network image database is for the web search (e.g., a web page database of a search engine), and the object image database is for the object search (e.g., a commodity database of an e-commerce platform), such that an abundance degree of corresponding network images in the network image database is far greater than that of the object images in the object image database. Due to abundant images in the first database, obtained retrieval feature images are more abundant and accurate, thereby making the object images obtained based on the retrieval feature images more abundant and accurate.

In some embodiments, the method according to the present disclosure may be used in commodity recommendation, item recommendation, similar item recommendation, and the like, which is not limited herein.

In some embodiments, the object may be an item, a plant, an animal, or the like, which is not limited herein.

In some embodiments, the retrieval image may be an image shot and uploaded by the user using a mobile phone, and may alternatively be any image uploaded by the user from a client.

In some embodiments, in step S210, a trained neural network is used to recognize the retrieval image of the target user to obtain the retrieval feature of the retrieval object, where the trained neural network is obtained by training using a plurality of classified images.

Figure 3:
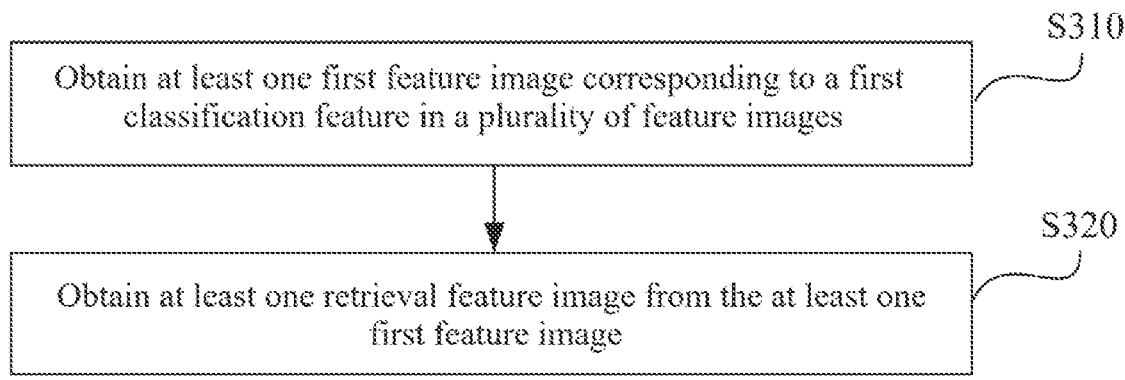
FIG. 3 is a flowchart of a process of obtaining, based on a retrieval feature, at least one retrieval feature image from a first database including a plurality of feature images in a method for recommending an object according to an embodiment of the present disclosure.

In some embodiments, each of the plurality of feature images corresponds to one of a plurality of classification features, and the retrieval feature includes a first classification feature corresponding to the retrieval object in the plurality of classification features. As shown in FIG. 3, the obtaining, based on the retrieval feature, at least one feature image from a first database including a plurality of feature images includes:

step S310: obtaining at least one first feature image corresponding to the first classification feature in the plurality of feature images; and step S320: obtaining the at least one retrieval feature image from the at least one first feature image.

The plurality of feature images in the first database are classified, the at least one first feature image corresponding to the classification feature of the retrieval object is obtained based on the classification feature, and the retrieval feature image is obtained from the at least one first feature image, such that a data processing amount is small.

In some embodiments, the classification feature includes, for example, a plurality of classifications that respectively correspond to mobile phones, clothes, food, and the like. In some other embodiments, the classification feature further includes multiple levels of sub-classifications included in a mobile phone classification corresponding to the mobile phones, such as a plurality of first sub-classifications corresponding to mobile phone brands, second sub-classifications corresponding to mobile phone models in each of the plurality of first sub-classifications.

In some embodiments, in step S310, the at least one feature image obtained from the first image database may be a feature image having the highest definition that corresponds to a first classification, such that the object image obtained based on the feature image is more accurate. For example, for the retrieval feature of the retrieval object being a type of the retrieval object, a large-screen mobile phone, the feature image of the retrieval object obtained in step S310 may be the clearest image in a plurality of obtained large-screen mobile phone images, and because the image is clearer than the retrieval image, the object image obtained based on the image is more accurate.

In an embodiment, in step S310, the at least one feature image obtained from the first image database may be a plurality of images corresponding to the first classification, such that more abundant object images are obtained based on the plurality of feature images. For example, for the retrieval feature of the retrieval object being a brand of the retrieval object, brand A, the feature image of the retrieval object obtained in step S310 may be a plurality of images obtained from an official website of the brand A, and because the images on the official website of the brand A often have better shooting angles and are abundant, object images obtained based on the images are more accurate and more abundant mobile phones of the brand A can also be obtained.

Figure 4:
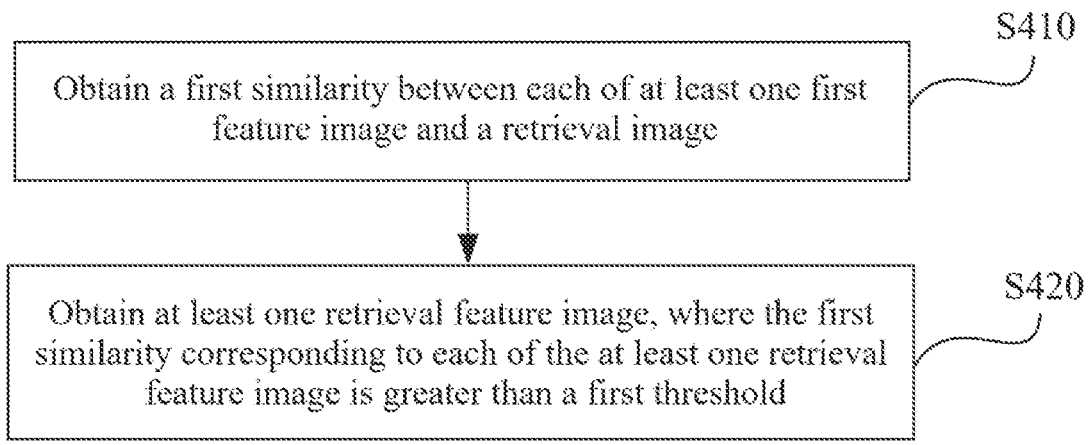
FIG. 4 is a flowchart of a process of obtaining at least one retrieval feature image from at least one first feature image in a method for recommending an object according to an embodiment of the present disclosure.

In some embodiments, as shown in FIG. 4, the obtaining the at least one retrieval feature image from the at least one first feature image includes:

step S410: obtaining a first similarity between each of the at least one first feature image and the retrieval image; and step S420: obtaining the at least one retrieval feature image, where the first similarity corresponding to each of the at least one retrieval feature image is greater than a first threshold.

The feature image with the similarity to the retrieval image being greater than the first threshold is obtained from the at least one first feature image corresponding to the first classification corresponding to the retrieval object and used as the retrieval feature image, where the retrieval feature image is further similar to the retrieval image in addition to being consistent with the classification corresponding to the retrieval object, such that the object image obtained based on the retrieval feature image is more accurate.

Figure 5:
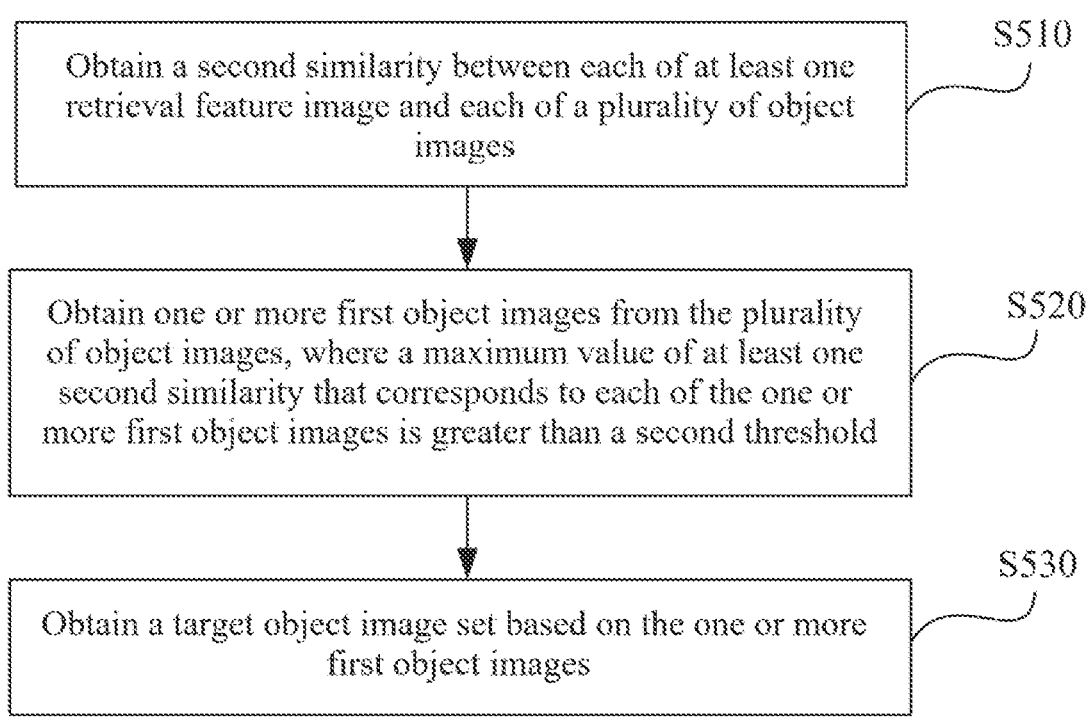
FIG. 5 is a flowchart of a process of obtaining, based on at least one retrieval feature image, a target object image set from a second database including a plurality of object images in a method for recommending an object according to an embodiment of the present disclosure.

In some embodiments, as shown in FIG. 5, the obtaining, based on the at least one retrieval feature image, a target object image set from a second database including a plurality of object images includes:

step S510: obtaining a second similarity between each of the at least one retrieval feature image and each of the plurality of object images;

step S520: obtaining one or more first object images from the plurality of object images, where a maximum value of at least one second similarity corresponding to each of the one or more first object images is greater than a second threshold; and step S530: obtaining the target object image set based on the one or more first object images.

One or more second object images are obtained from the plurality of object images, and the target object image set is obtained from the one or more first object images. Due to a relatively high second similarity between the retrieval feature image and each of the one or more first object images (the maximum value of at least one second similarity that corresponds to the first object image is greater than the second threshold) and a higher matching degree between each of the one or more first object images and the retrieval image, the target object image set obtained based on each of the one or more first object images is more accurate, thereby better meeting user requirements.

In some other embodiments, an object image with a maximum average value of the at least one second similarity that corresponds to the plurality of object images may be used as the first object image, and the target object image set is obtained based on the first object image, to be recommended to a target user.

Figure 6:
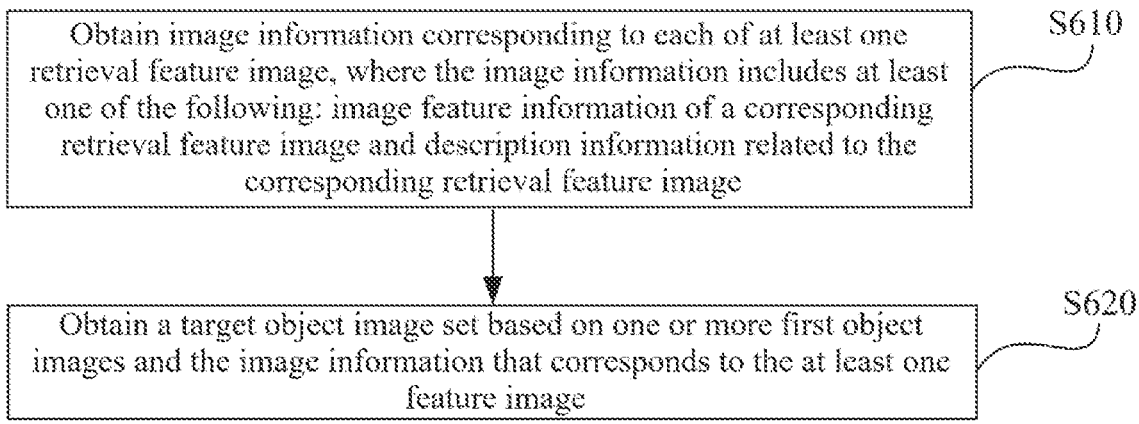
FIG. 6 is a flowchart of a process of obtaining a target object image set based on one or more first object images in a method for recommending an object according to an embodiment of the present disclosure.

In some embodiments, as shown in FIG. 6, the obtaining the target object image set based on the one or more first object images includes:

step S610: obtaining image information corresponding to each of the at least one retrieval feature image, where the image information includes at least one of the following: image feature information of a corresponding retrieval feature image and description information related to the corresponding retrieval feature image; and step S620: obtaining the target object image set based on the one or more first object images and the image information corresponding to the at least one retrieval feature image.

The target object image is obtained based on the image feature information of the retrieval feature image and the description information related to the retrieval feature image, and because the image feature information and the description information of the retrieval feature image include more information related to the retrieval object, such as a brand logo and color, the object in the target object image obtained based on the image information better meets the user requirements.

In some embodiments, the first database is a network image database, and the obtaining image information corresponding to each of the at least one retrieval feature image includes: obtaining a title of a web page that corresponds to each of the at least one retrieval feature image or key words in the web page or key words corresponding to a user request, or the like.

In some embodiments, the obtaining image information corresponding to each of the at least one retrieval feature image includes: obtaining an image feature in each of the at least one retrieval feature image, such as a pixel value of the retrieval object.

Figure 7:
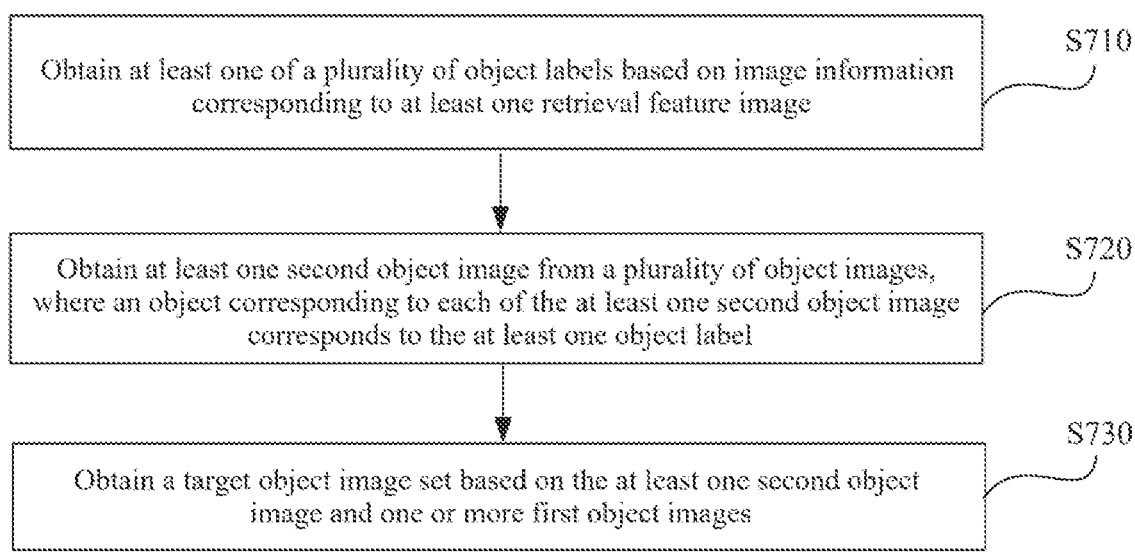
FIG. 7 is a flowchart of a process of obtaining a target object image set based on one or more first object images and image information that corresponds to at least one feature image in a method for recommending an object according to an embodiment of the present disclosure.

In some embodiments, each of the plurality of object images corresponds to one of a plurality of objects, and each of the plurality of objects corresponds to one or more of a plurality of object labels, and as shown in FIG. 7, the step S620 of obtaining the target object image set based on the one or more first object images and the image information corresponding to the at least one retrieval feature image includes:

step S710: obtaining at least one of the plurality of object labels based on the image information corresponding to the at least one retrieval feature image;

step S720: obtaining at least one second object image from the plurality of object images, where an object corresponding to each of the at least one second object image corresponds to the at least one object label; and step S730: obtaining the target object image set based on the at least one second object image and the one or more first object images.

The object label of the corresponding object is obtained based on the image information of the retrieval feature image, and because the object label describes the object more accurately, for example, the object label includes a brand, a model, a size, etc., the target object image set obtained based on the object label is more accurate.

In some embodiments, the target object image set includes one or more third object images in the one or more first object images, where each of the one or more third object images at least correspond to the object corresponding to one of the at least one second object image.

The third object image that the corresponding object of which is the same as to the second object image is obtained from the one or more first object images similar to the retrieval feature image and used as the target object image, such that the target object image is more accurate.

In some embodiments, the obtaining the target object image set based on the at least one second object image and the one or more first object images further includes: obtaining user preference information, and obtaining the target image set from the at least one second object image and the one or more first object images based on a user preference.

The user preference includes a preference of the user for search accuracy and a preference of the user for search universality. For example, when the user preference is the preference for the search accuracy, the target object image set may include the above third object image; and when the user preference is the preference for the search universality, the target object image set may include the above at least one second object image and the one or more first object images.

In the technical solutions of the present disclosure, collection, storage, use, processing, transmission, provision, disclosure, etc. of user personal information involved all comply with related laws and regulations and are not against the public order and good morals.

Figure 8:
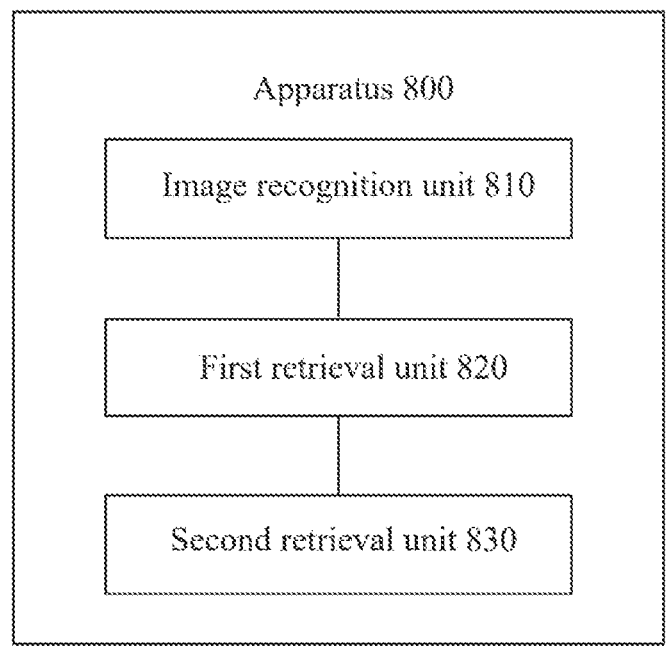
FIG. 8 is a structural block diagram of an object recommendation apparatus according to an embodiment of the present disclosure.

According to another aspect of the present disclosure, there is further provided an apparatus for recommending an object. Referring to FIG. 8, the apparatus 800 includes: an image recognition unit 810, configured to recognize a retrieval feature of a retrieval object from a retrieval image of a target user including the retrieval object; a first retrieval unit 820, configured to obtain, based on the retrieval feature, at least one retrieval feature image from a first database including a plurality of feature images; and a second retrieval unit 830, configured to obtain, based on the at least one retrieval feature image, a target object image set from a second database including a plurality of object images, to be recommended to the target user.

In some embodiments, each of the plurality of feature images corresponds to one of a plurality of classification features, and the retrieval feature includes a first classification feature corresponding to the retrieval object in the plurality of classification features, and where the first retrieval unit includes: a first retrieval subunit, configured to obtain at least one first feature image corresponding to the first classification feature in the plurality of feature images; and a first obtaining unit, configured to obtain the at least one retrieval feature image from the at least one first feature image.

In some embodiments, the first obtaining unit includes: a first similarity obtaining unit, configured to obtain a first similarity between each of the at least one first feature image and the retrieval image; and a first obtaining subunit, configured to obtain the at least one retrieval feature image, where the first similarity corresponding to each of the at least one retrieval feature image is greater than a first threshold.

In some embodiments, the second retrieval unit includes: a second similarity obtaining unit, configured to obtain a second similarity between each of the at least one retrieval feature image and each of the plurality of object images; a second obtaining unit, configured to obtain one or more first object images from the plurality of object images, where a maximum value of at least one second similarity corresponding to each of the one or more first object images is greater than a second threshold; and a third obtaining unit, configured to obtain the target object image set based on the one or more first object images.

In some embodiments, the third obtaining unit includes: a third obtaining subunit, configured to obtain image information corresponding to each of the at least one retrieval feature image, where the image information includes at least one of the following: image feature information of a corresponding retrieval feature image and description information related to the corresponding retrieval feature image; and a fourth obtaining unit, configured to obtain the target object image set based on the one or more first object images and the image information corresponding to the at least one retrieval feature image.

In some embodiments, each of the plurality of object images corresponds to one of a plurality of objects, and each of the plurality of objects corresponds to one or more of a plurality of object labels, and where the fourth obtaining unit includes: a fifth obtaining unit, configured to obtain at least one of the plurality of object labels based on the image information corresponding to the at least one retrieval feature image; a sixth obtaining unit, configured to obtain at least one second object image from the plurality of object images, where an object corresponding to each of the at least one second object image corresponds to the at least one object label; and a target obtaining unit, configured to obtain the target object image set based on the at least one second object image and the one or more first object images.

In some embodiments, the target object image set includes one or more third object images in the one or more first object images, where each of the one or more third object images at least correspond to the object corresponding to one of the at least one second object image.

In some embodiments, the first database is a network image database for a web search, and the second database is an object image database for an object search, where the number of the plurality of object images is less than the number of the plurality of feature images.

According to one or more embodiments of the present disclosure, the retrieval image including the retrieval object is recognized to obtain the retrieval feature (e.g., when the retrieval object is a mobile phone, the retrieval feature may be a mobile phone classification) of the retrieval object, and the feature image corresponding to the retrieval object is obtained from the first database including the plurality of feature images, and then the target object image set is obtained by matching the feature image with an object image database, to be recommended to the target user. Due to high definition and a good shooting angle of the feature images in the first database, a feature of the retrieval object is better reflected, such that the object image obtained based on the feature image is more accurate, that is, a target object image set recommended to the user is more accurate.

According to another aspect of the present disclosure, there is further provided an electronic device, including: at least one processor; and a memory communicatively connected to the at least one processor, where the memory stores a computer program, and when the computer program is executed by the at least one processor, the above method is implemented.

According to another aspect of the present disclosure, there is further provided a non-transitory computer-readable storage medium storing a computer program, where when the computer program is executed by a processor, the above method is implemented.

According to another aspect of the present disclosure, there is further provided a computer program product including a computer program, where when the computer program is executed by a processor, the above method is implemented.

According to the embodiments of the present disclosure, there are further provided an electronic device, a readable storage medium, and a computer program product.

Figure 9:
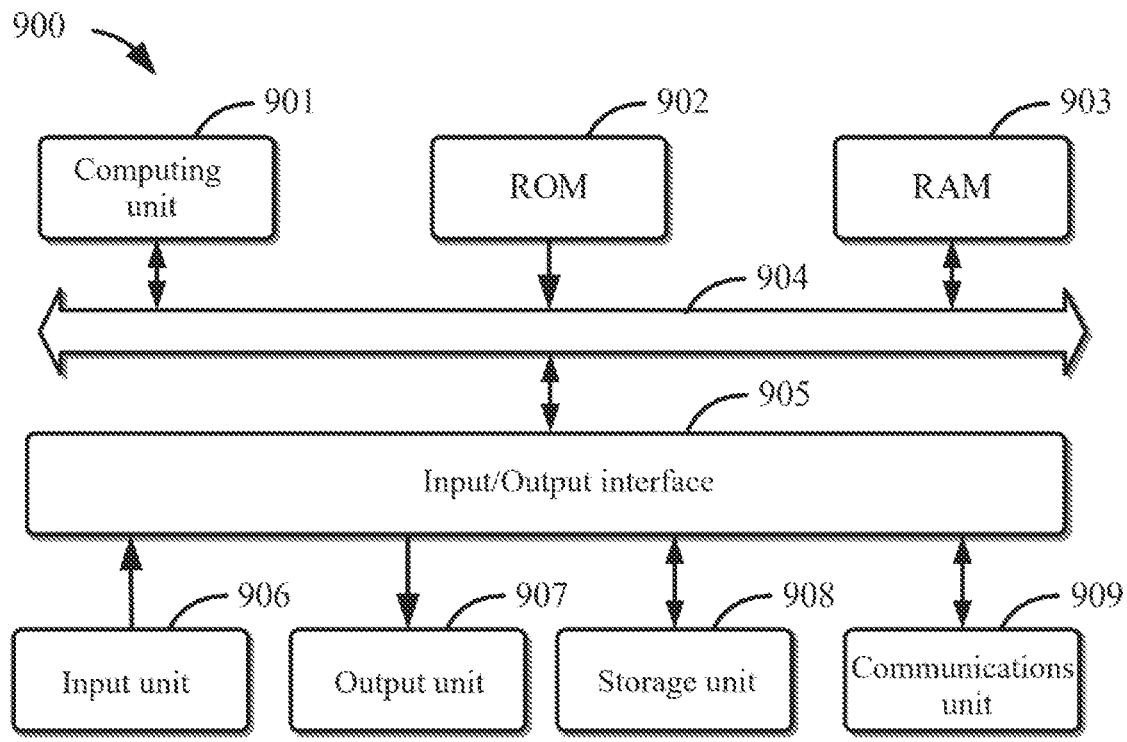
FIG. 9 is a structural block diagram of an exemplary electronic device that can be used to implement an embodiment of the present disclosure.

Referring to FIG. 9, a structural block diagram of an electronic device 900 that can serve as a server or a client of the present disclosure is now described, which is an example of a hardware device that may be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 9, the device 900 includes a computing unit 901, which may perform various appropriate actions and processing according to a computer program stored in a read-only memory (ROM) 902 or a computer program loaded from a storage unit 908 to a random access memory (RAM) 903. The RAM 903 may further store various programs and data required for the operation of the device 900. The computing unit 901, the ROM 902, and the RAM 903 are connected to each other through a bus 904. An input/output (I/O) interface 905 is also connected to the bus 904.

A plurality of components in the device 900 are connected to the I/O interface 905, including: an input unit 906, an output unit 907, the storage unit 908, and a communications unit 909. The input unit 906 may be any type of device capable of entering information to the device 900. The input unit 906 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 907 may be any type of device capable of presenting information, and may include, but is not limited to, a display, a speaker, an object/audio output terminal, a vibrator, and/or a printer. The storage unit 908 may include, but is not limited to, a magnetic disk and an optical disc. The communications unit 909 allows the device 900 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 1302.11 device, a Wi-Fi device, a WiMAX device, a cellular communication device, and/or the like.

The computing unit 901 may be various general-purpose and/or special-purpose processing components with processing and computing capabilities. Some examples of the computing unit 901 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 901 performs the various methods and processing described above, for example, the method 200. For example, in some embodiments, the method 200 may be implemented as a computer software program, which is tangibly contained in a machine-readable medium, such as the storage unit 908. In some embodiments, a part or all of the computer program may be loaded and/or installed onto the device 900 via the ROM 902 and/or the communications unit 909. When the computer program is loaded onto the RAM 903 and executed by the computing unit 901, one or more steps of the method 200 described above can be performed. Alternatively, in other embodiments, the computing unit 901 may be configured, by any other suitable means (for example, by means of firmware), to perform the method 200.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely exemplary embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A method for recommending an object, comprising:
recognizing, by using a trained neural network, a retrieval feature of a retrieval object from a retrieval image including the retrieval object, wherein the retrieval image is uploaded by a target user through a client device, the trained neural network is trained using a plurality of classified images, and the retrieval feature of the retrieved object is a type of the retrieval object;
obtaining, based on the retrieval feature, at least one retrieval feature image from a first database including a plurality of feature images, wherein each feature image of the plurality of feature images in the first database corresponds to one classification feature of a plurality of classification features, wherein the classification feature represents a classification of each feature image, wherein the retrieval feature includes a first classification feature corresponding to the retrieval object in the plurality of classification features, and wherein the obtaining at least one retrieval image from the first database including the plurality of feature images comprises:
obtaining at least one first feature image corresponding to the first classification feature in the plurality of feature images; and
obtaining the at least one retrieval feature image from the at least one first feature image, wherein the obtaining the at least one retrieval feature image from the at least one first feature image comprises:
obtaining a first similarity between each first feature image of the at least one first feature image and the retrieval image; and
obtaining the at least one retrieval feature image, wherein the first similarity corresponding to each retrieval feature image of the at least one retrieval feature image is greater than a first threshold;
obtaining, based on the at least one retrieval feature image, a target object image set from a second database including a plurality of object images, wherein the obtaining the target object image set from the second database including the plurality of object images comprises:
obtaining a second similarity between each retrieval feature image of the at least one retrieval feature image and each object image of the plurality of object images;
obtaining one or more first object images from the plurality of object images, wherein a maximum value of at least one second similarity corresponding to each first object image of the one or more first object images is greater than a second threshold; and
obtaining the target object image set based on the one or more first object images; and providing the target object image set as one or more recommendation objects to the client device.

2. The method according to claim 1, wherein the obtaining the target object image set based on the one or more first object images comprises:
obtaining image information corresponding to each retrieval feature image of the at least one retrieval feature image, wherein the image information includes at least one of the following: image feature information of a corresponding retrieval feature image and description information related to the corresponding retrieval feature image; and
obtaining the target object image set based on the one or more first object images and the image information corresponding to the at least one retrieval feature image.

3. The method according to claim 2, wherein each object image of the plurality of object images corresponds to one object of a plurality of objects, and each object of the plurality of objects corresponds to one or more of a plurality of object labels, and wherein the obtaining the target object image set based on the one or more first object images and one or more pieces of image information corresponding to the at least one retrieval feature image comprises:
obtaining at least one object label of the plurality of object labels based on the image information corresponding to the at least one retrieval feature image;
obtaining at least one second object image from the plurality of object images, wherein an object corresponding to each second object image of the at least one second object image corresponds to the at least one object label; and
obtaining the target object image set based on the at least one second object image and the one or more first object images.

4. The method according to claim 3, wherein the target object image set includes one or more third object images in the one or more first object images, wherein each third object image of the one or more third object images at least correspond to the object corresponding to one second object image of the at least one second object image.

5. The method according to claim 1, wherein the first database is a network image database for a web search, and the second database is an object image database for an object search, wherein the plurality of object images is less than the plurality of feature images.

6. An electronic device, comprising:
one or more processors; and
a memory storing one or more programs configured to be executed by the one or more processors, the one or more programs including instructions for:
recognizing, by using a trained neural network, a retrieval feature of a retrieval object from a retrieval image including the retrieval object, wherein the retrieval image is uploaded by a target user through a client device, the trained neural network is trained using a plurality of classified images, and the retrieval feature of the retrieval object is a type of the retrieval object;
obtaining, based on the retrieval feature, at least one retrieval feature image from a first database including a plurality of feature images, wherein each feature image of the plurality of feature images in the first database corresponds to one classification feature of a plurality of classification features, wherein the classification feature represents a classification of each feature image, wherein the retrieval feature includes a first classification feature corresponding to the retrieval object in the plurality of classification features, and wherein the obtaining at least one retrieval feature image from the first database including the plurality of feature images comprises:
obtaining at least one first feature image corresponding to the first classification feature in the plurality of feature images; and
obtaining the at least one retrieval feature image from the at least one first feature image, wherein the obtaining the at least one retrieval feature image from the at least one first feature image comprises:
obtaining a first similarity between each first feature image of the at least one first feature image and the retrieval image; and
obtaining the at least one retrieval feature image, wherein the first similarity corresponding to each retrieval feature image of the at least one retrieval feature image is greater than a first threshold;
obtaining, based on the at least one retrieval feature image, a target object image set from a second database including a plurality of object images, wherein the obtaining the target object image set from the second database including the plurality of object images comprises:
obtaining a second similarity between each retrieval feature image of the at least one retrieval feature image and each object image of the plurality of object images;
obtaining one or more first object images from the plurality of object images, wherein a maximum value of at least one second similarity corresponding to each first object image of the one or more first object images is greater than a second threshold; and obtaining the target object image set based on the one or more first object images; and providing the target object image set as one or more recommendation objects to the client.

7. A non-transitory computer-readable storage medium storing one or more programs, the one or more programs comprising instructions, which when executed by one or more processors of an electronic device, cause the electronic device to perform:

recognizing, by using a trained neural network a retrieval feature of a retrieval object from a retrieval image including the retrieval object, wherein the retrieval image is uploaded by a target user through a client device, the trained neural network is trained using a plurality of classified images, and the retrieval feature of the retrieval object is a type of the retrieval object;

obtaining, based on the retrieval feature, at least one retrieval feature image from a first database including a plurality of feature images, wherein each feature image of the plurality of feature images in the first database corresponds to one classification feature of a plurality of classification features, wherein the classification feature represents a classification of each feature image, wherein the retrieval feature includes a first classification feature corresponding to the retrieval object in the plurality of classification features, and wherein the obtaining at least one retrieval feature image from the first database including the plurality of feature images comprises:

obtaining at least one first feature image corresponding to the first classification feature in the plurality of feature images; and obtaining the at least one retrieval feature image from the at least one first feature image, wherein the obtaining the at least one retrieval feature image from the at least one first feature image comprises:

obtaining a first similarity between each first feature image of the at least one first feature image and the retrieval image; and obtaining the at least one retrieval feature image, wherein the first similarity corresponding to each retrieval image of the at least one retrieval feature image is greater than a first threshold;

obtaining, based on the at least one retrieval feature image, a target object image set from a second database including a plurality of object images, wherein the obtaining the target object image set from the second database including the plurality of object images comprises:

obtaining a second similarity between each retrieval feature image of the at least one retrieval feature image and each object image of the plurality of object images;

obtaining one or more first object images from the plurality of object images, wherein a maximum value of at least one second similarity corresponding to each first object image of the one or more first object images is greater than a second threshold; and obtaining the target object image set based on the one or more first object images; and providing the target object image set as one or more recommendation objects to the client device.

8. The electronic device according to claim 6, wherein the obtaining the target object image set based on the one or more first object images comprises:

obtaining image information corresponding to each retrieval feature image of the at least one retrieval feature image, wherein the image information includes at least one of the following: image feature information of a corresponding retrieval feature image and description information related to the corresponding retrieval feature image; and obtaining the target object image set based on the one or more first object images and the image information corresponding to the at least one retrieval feature image.

9. The electronic device according to claim 8, wherein each object image of the plurality of object images corresponds to one object of a plurality of objects, and each object of the plurality of objects corresponds to one or more of a plurality of object labels, and wherein the obtaining the target object image set based on the one or more first object images and one or more pieces of image information corresponding to the at least one retrieval feature image comprises:

obtaining at least one object label of the plurality of object labels based on the image information corresponding to the at least one retrieval feature image;

obtaining at least one second object image from the plurality of object images, wherein an object corresponding to each second object image of the at least one second object image corresponds to the at least one object label; and obtaining the target object image set based on the at least one second object image and the one or more first object images.

10. The electronic device according to claim 9, wherein the target object image set includes one or more third object images in the one or more first object images, wherein each third object image of the one or more third object images at least correspond to the object corresponding to one second object image of the at least one second object image.

11. The electronic device according to claim 6, wherein the first database is a network image database for a web search, and the second database is an object image database for an object search, wherein the plurality of object images is less than of the plurality of feature images.

* * * * *